United States Patent
Sathe et al.

(10) Patent No.: US 12,079,392 B2
(45) Date of Patent: Sep. 3, 2024

(54) SYSTEM AND METHOD FOR MODIFYING HAPTIC FEEDBACK RESPONSE OF A TOUCH SENSOR

(71) Applicant: Sensel, Inc., Sunnyvale, CA (US)

(72) Inventors: Ninad Sathe, Sunnyvale, CA (US); Vijay Rajanna, Sunnyvale, CA (US); Ilya Daniel Rosenberg, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 18/141,317

(22) Filed: Apr. 28, 2023

(65) Prior Publication Data

US 2023/0350494 A1 Nov. 2, 2023

Related U.S. Application Data

(63) Continuation-in-part of application No. 17/949,902, filed on Sep. 21, 2022, now Pat. No. 11,693,520, (Continued)

(51) Int. Cl.
G06F 3/16 (2006.01)
G06F 3/01 (2006.01)
G06F 3/041 (2006.01)

(52) U.S. Cl.
CPC ............ G06F 3/016 (2013.01); G06F 3/0418 (2013.01); G06F 3/0414 (2013.01)

(58) Field of Classification Search
CPC ..................................................... G06F 3/016
(Continued)

(56) References Cited

U.S. PATENT DOCUMENTS 11,392,130 B1 * 7/2022 Desrosiers ........... G05D 1/0246
11,474,530 B1 * 10/2022 Boyraz ................ G05D 1/0088
(Continued)

OTHER PUBLICATIONS

International Search Report and Written Opinion for International Application No. PC/US23/20486 mailed on Aug. 1, 2023; 10 pages.
(Continued)

*Primary Examiner* — Ruay Ho
(74) *Attorney, Agent, or Firm* — Run8 Patent Group, LLC; Peter Miller; Alexander Rodriguez

(57) ABSTRACT

One variation of a method for modifying haptic feedback response includes, during a set-up period: at a calibration system, applying a target selection force, to a target location on a surface of a touch sensor; at the touch sensor, triggering vibration cycles across haptic actuators to oscillate the touch sensor surface; capturing a haptic waveform representing oscillations at the first target location on the surface during the vibration cycles; interpreting a vibration cycle for the haptic actuators corresponding to a target haptic intensity at the target location based on the haptic waveform. The method also includes, during a deployment period, following the set-up period: detecting a force magnitude for a touch input applied proximal the target location on the surface; and in response to the force magnitude exceeding the target selection force, triggering the vibration cycle at the haptic actuators to oscillate the surface at the target haptic intensity.

14 Claims, 6 Drawing Sheets

Related U.S. Application Data which is a continuation of application No. 17/554,985, filed on Dec. 17, 2021, now Pat. No. 11,494,034, which is a continuation of application No. 17/207,546, filed on Mar. 19, 2021, now Pat. No. 11,231,812.

(60) Provisional application No. 62/992,077, filed on Mar. 19, 2020, provisional application No. 63/336,845, filed on Apr. 29, 2022.

(58) Field of Classification Search
USPC .......................... 715/702; 382/103; 345/173
See application file for complete search history.

(56) References Cited

U.S. PATENT DOCUMENTS

| | | | |
|---|---|---|---|
| 2013/0307789 A1* | 11/2013 | Karamath | G06F 3/016 345/173 |
| 2015/0269745 A1* | 9/2015 | Klimer | G06T 7/262 382/103 |
| 2017/0244539 A1 | 8/2017 | Hanna et al. | |
| 2018/0204426 A1 | 7/2018 | Nagisetty et al. | |
| 2021/0278967 A1 | 9/2021 | Rosenberg et al. | |
| 2021/0294479 A1* | 9/2021 | Moscovich | G06F 3/045 |
| 2022/0113803 A1 | 4/2022 | Rosenberg et al. | |
| 2022/0391585 A1* | 12/2022 | Bellegarda | G06F 3/04883 |

OTHER PUBLICATIONS

Notification of the International Application No. and of the International Filing Date for International Application No. PCT/US23/20486 mailed on May 30, 2023; 1 page.

Notice of Allowance received in U.S. Appl. No. 17/207,546 dated Sep. 2021.

Notice of Allowance received in U.S. Appl. No. 17/554,985 dated Jun. 21, 2022.

Notice of Allowance received in U.S. Appl. No. 17/949,902 dated Feb. 21, 2023.

* cited by examiner

SYSTEM AND METHOD FOR MODIFYING HAPTIC FEEDBACK RESPONSE OF A TOUCH SENSOR

CROSS-REFERENCE TO RELATED APPLICATIONS

This application claims the benefit of U.S. Provisional Application No. 63/336,845, filed on 29 Apr. 2022, which is incorporated in its entirety by this reference.

This Application is a continuation-in-part of U.S. Non-Provisional application Ser. No. 17/949,902, filed on 21 Sep. 2022, which is a continuation of U.S. Non-Provisional patent application Ser. No. 17/554,985, filed on 17 Dec. 2021, which is a continuation of U.S. Non-Provisional patent application Ser. No. 17/207,546, filed on 19 Mar. 2021, which claims priority to U.S. Provisional Patent Application No. 62/992,077, filed on 19 Mar. 2020, which is incorporated in its entirety by this reference.

This application is related to U.S. application Ser. No. 17/855,747, filed on 30 Jun. 2022, and Ser. No. 17/949,902, filed on 21 Sep. 2022, each of which is incorporated in its entirety by this reference.

TECHNICAL FIELD

This invention relates generally to the field of touch sensors and more specifically to new and useful haptic feedback calibration system and methods in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
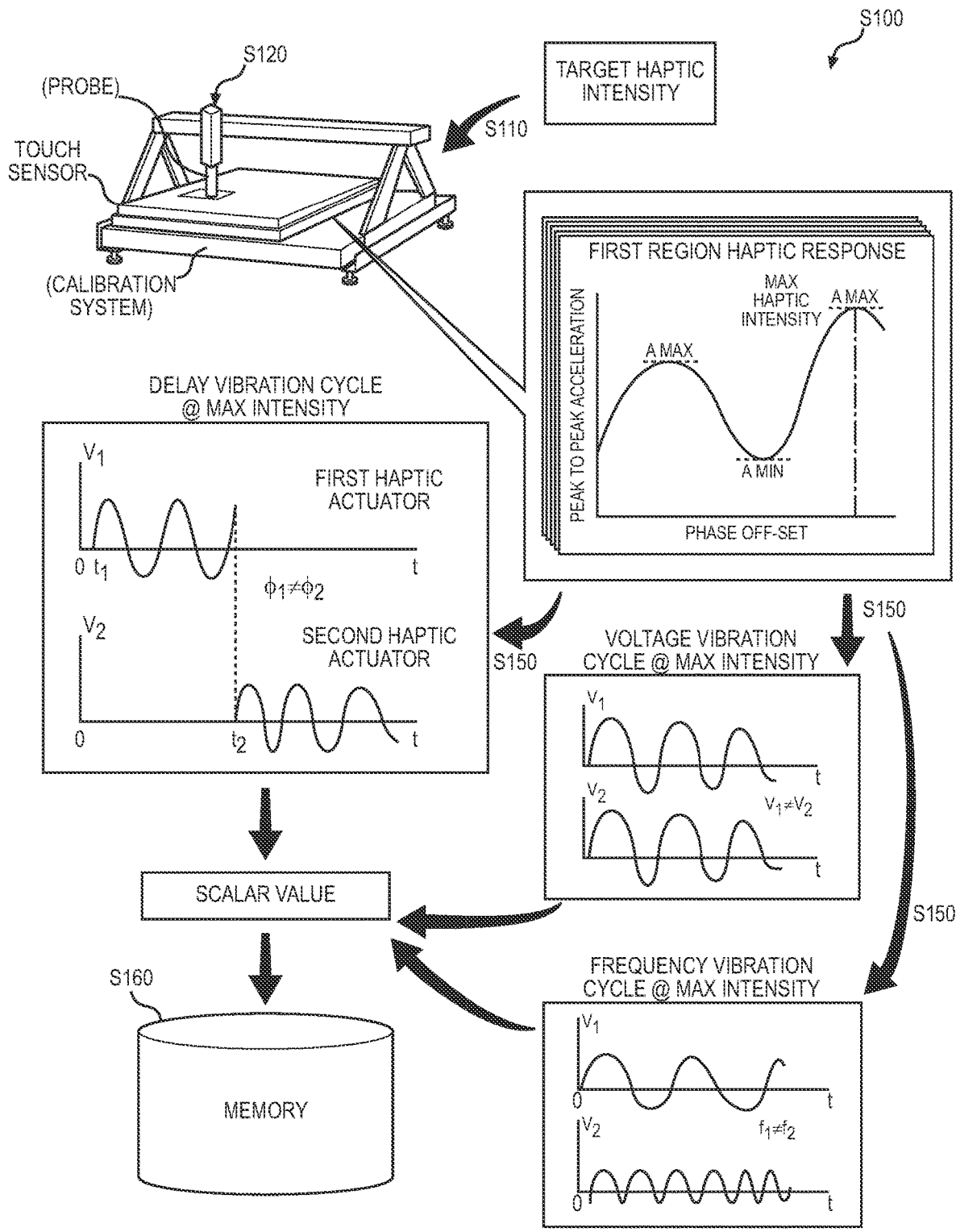
FIG. 1 is a flowchart representation of a method.
Figure 2:
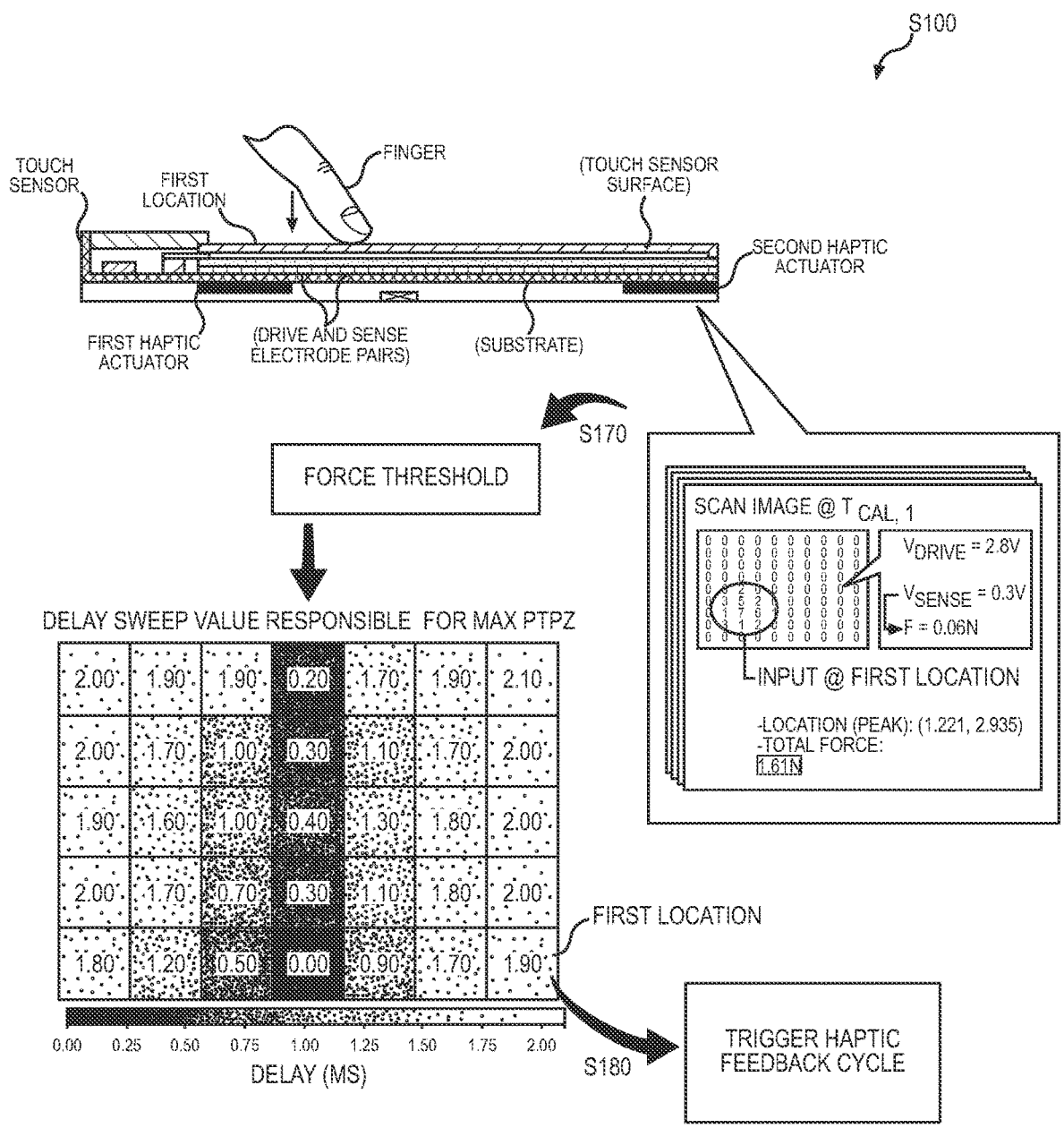
FIG. 2 is a flowchart representation of one variation of the method.
Figure 3:
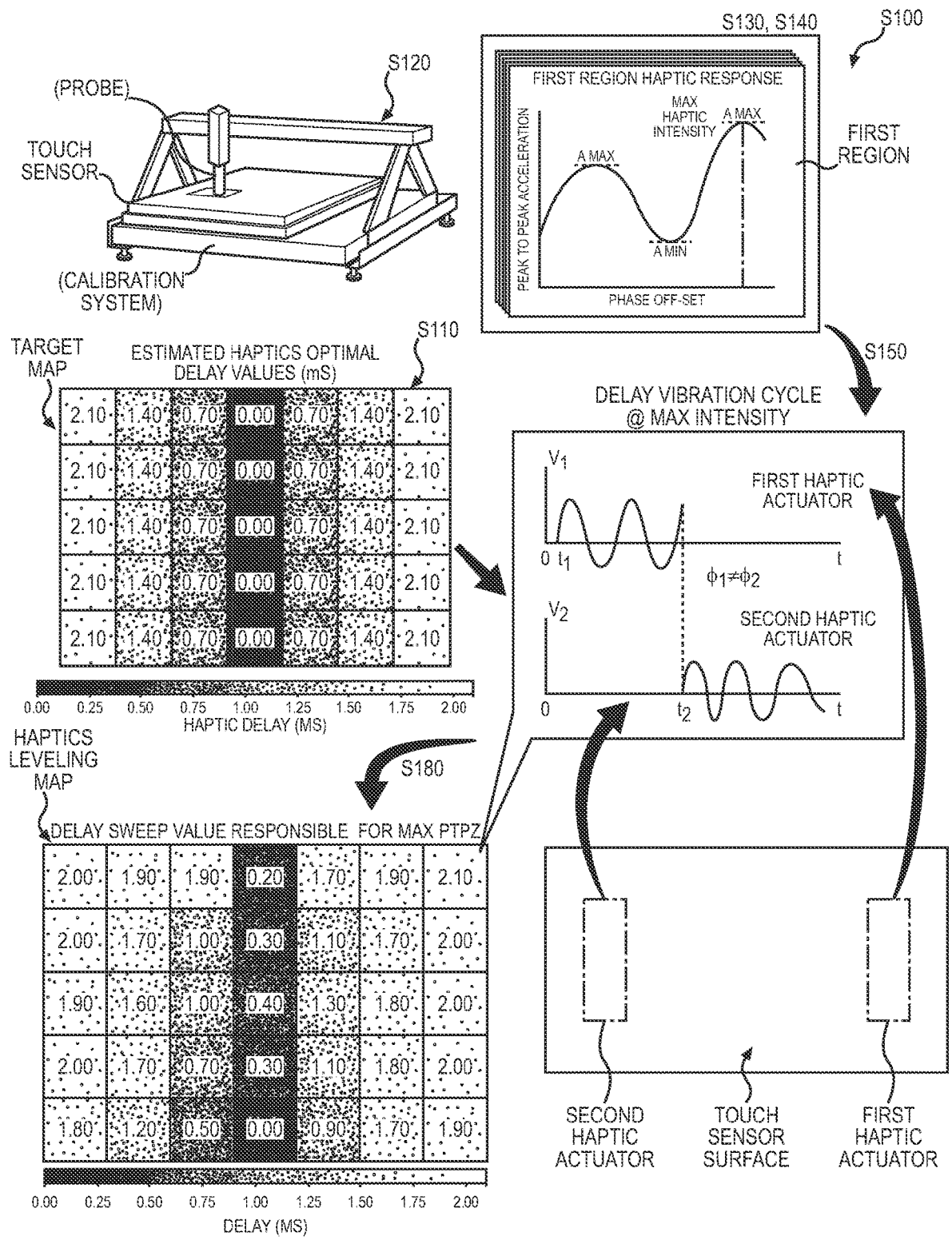
FIG. 3 is a flowchart representation of one variation of the method.
Figure 4:
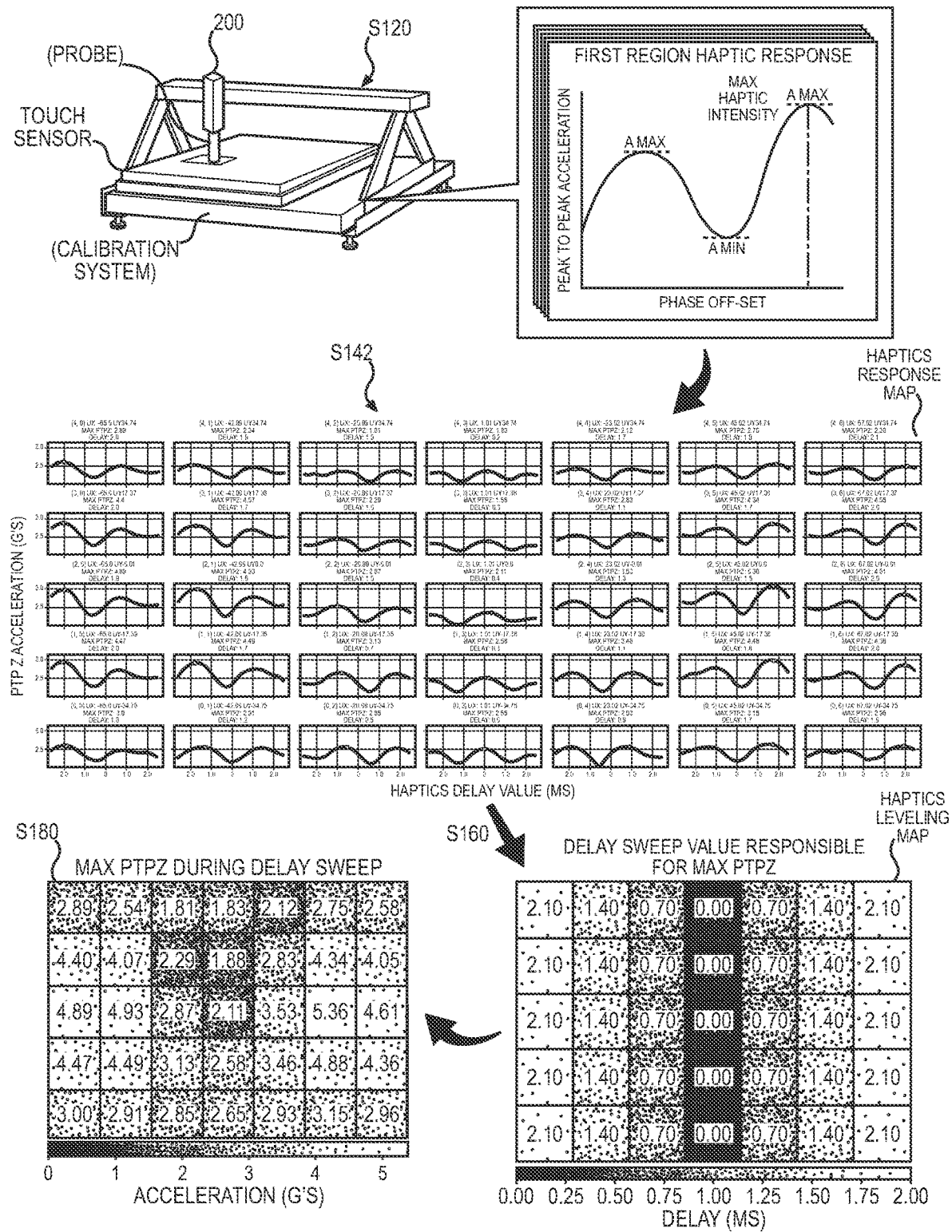
FIG. 4 is a flowchart representation of one variation of the method.
Figure 5:
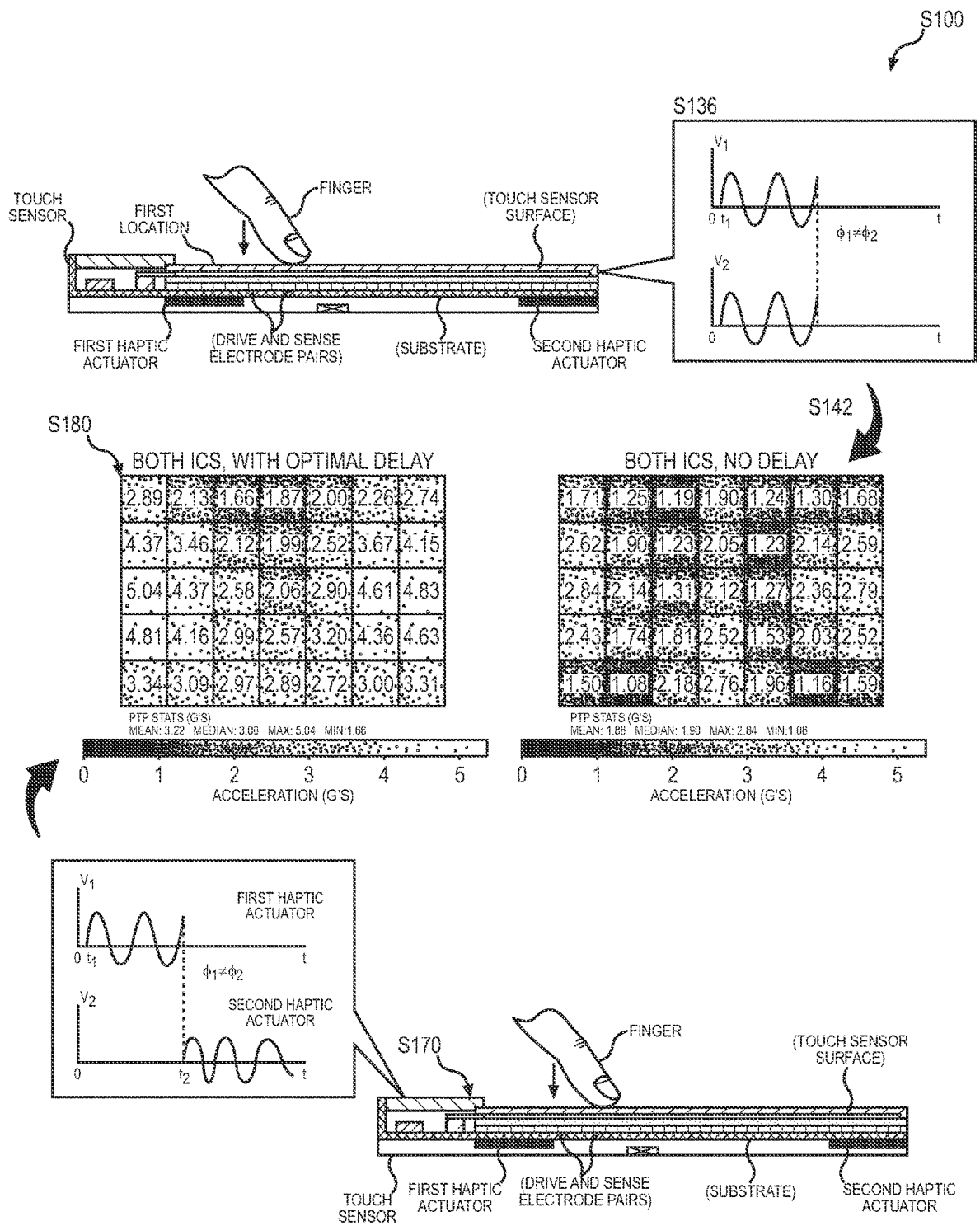
FIG. 5 is a flowchart representation of one variation of the method.
Figure 6:
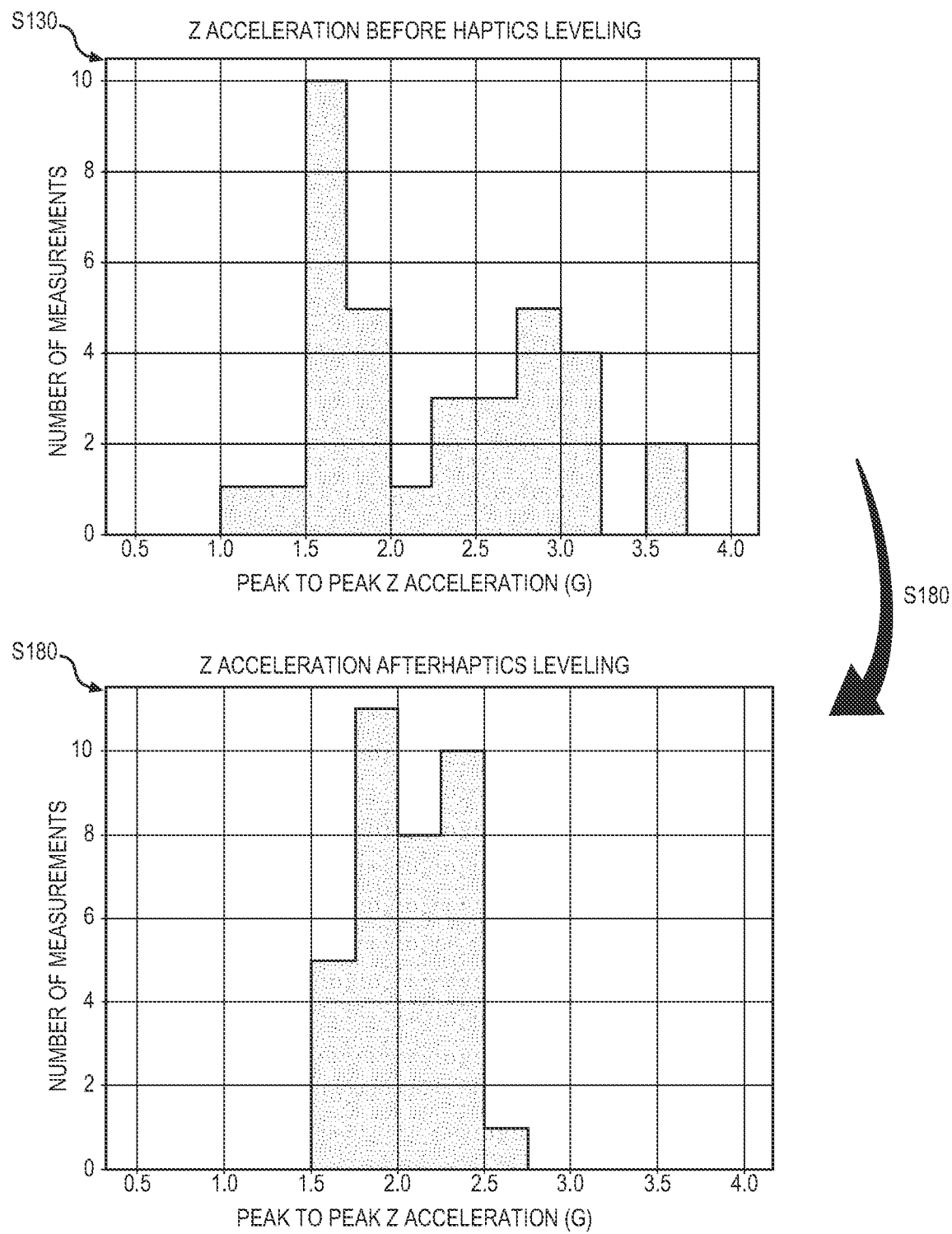
FIG. 6 is a flowchart representation of one variation of the method.

As shown in FIG. 1, a method S100 for modifying haptic feedback includes, during a set-up period: accessing a target haptic intensity across a touch sensor surface of a touch sensor during a haptic feedback cycle in Block S110; and, at a calibration system, applying a probe, at a target selection force, to a first target location on a touch sensor surface in Block S120.

The method S100 further includes, during the set-up period: at the touch sensor, triggering a sequence of vibration cycles across a set of haptic actuators to oscillate the touch sensor surface in Block S130; capturing a first haptic waveform representing oscillations at the first target location on the touch sensor surface during the sequence of vibration cycles in Block S140; and interpreting a first vibration cycle for the set of haptic actuators corresponding to the target haptic intensity at the first target location based on the first haptic waveform in Block S150.

The method S100 also includes, during a deployment period, following the set-up period: at a first time, capturing a first touch image representing magnitudes of forces detected on the touch sensor surface; interpreting a first force magnitude for a first touch input applied proximal the first target location on the touch sensor surface based on the first touch image in Block S170; and, in response to the first force magnitude exceeding the target selection force, triggering the first vibration cycle at the set of haptic actuators to oscillate the touch sensor surface at the target haptic intensity in Block S180.

One variation of the method S100 for modifying haptic feedback includes, during a set-up period: accessing a target haptic intensity across a touch sensor surface of a touch sensor during a haptic feedback cycle in Block S110; and, at a calibration system, applying a probe, at a target selection force, to a sequence of locations on the touch sensor surface in Block S120.

This variation of the method S100 further includes, during the set-up period, for each location in the sequence of locations: at the touch sensor, triggering a sequence of vibration cycles across a set of haptic actuators to oscillate the touch sensor surface in Block S130; capturing a haptic waveform representing oscillations at the location on the touch sensor surface during the sequence of vibration cycles in Block S140; and storing the haptic waveform in a haptics response map in Block S142.

This variation of the method S100 also includes, during the set-up period, generating a haptics leveling map defining vibration cycles for oscillating the touch sensor surface at the target haptic intensity based on the haptics response map in Block S160.

This variation of the method S100 also includes, during a deployment period: capturing a first touch image representing magnitudes of forces detected on the touch sensor surface; detecting a first input at a first location on the touch sensor surface based on the first touch image in Block S170; and, in response to detecting the first input at the first location, triggering a first vibration cycle corresponding to the first location of the touch sensor surface defined in the haptics leveling map in Block S180.

2. Terms

Generally, a "haptic intensity" as referred to herein is a haptic feedback response from a haptic actuator, such as peak-to-peak accelerations, and/or acoustics, across a touch sensor surface.

Generally, a "vibration cycle" as referred to herein is a signal, such as an oscillating voltage signal, delivered to a haptic actuator to oscillate a touch sensor surface.

3. Applications

Generally, the method S100 can be executed by a touch sensor—in conjunction with a calibration system—in order to: calibrate haptic feedback response across regions of a touch sensor surface; compensate for haptic signal interference across the touch sensor surface generated during concurrent actuation of two or more haptic actuators; deliver consistent (or targeted) haptic feedback intensities at discrete to the locations or regions on the touch sensor surface; and achieve a uniform (or controllable) haptic response across the touch sensor surface. In particular, the touch sensor includes a haptic feedback module or a set of haptic actuators: arranged below the touch sensor surface; and configured to oscillate the touch sensor surface in response to detection of forces applied on the touch sensor surface. A controller in the touch sensor can thus: interpret a force magnitude of an input on a particular region on the touch sensor surface based on electrical signals read from sensors in the touch sensor; and independently trigger a vibration cycle for all or a subset of these haptic actuators in order to oscillate the particular region on touch sensor surface at a target frequency and/or amplitude, such as in response to the force magnitude of the input exceeding a threshold input force.

Generally, haptic signals (i.e., "oscillations") generated by a haptic feedback module radiates outwardly from the haptic feedback module and propagates through the cover layer (e.g., at a fixed speed). Concurrent oscillations induced by multiple haptic feedback module may also constructively or destructively interfere on the touch sensor surface, such as based on: physical offset between the haptic actuators; differences in oscillation frequencies of the haptic feedback module; and/or phase offset between operation of the haptic actuators. Local oscillations—and therefore perceived haptic feedback intensity—across the touch sensor surface may not be uniform across the touch sensor surface.

Thus, the touch sensor—in conjunction with a calibration system—can execute the calibration cycle according to the method S100 in order to: record a haptic feedback intensity (e.g., waveforms, peak to peak accelerations, acoustics) for a particular region on the touch sensor surface in response to applying a force magnitude on the particular region; select a target haptic feedback intensity (e.g., target peak to peak amplitude) for the particular region based on the haptic feedback intensities recorded for the particular region; define a vibration cycle containing a target amplitude, a target phase offset, and a target time duration for each of the haptic actuators in order to achieve the target feedback intensity for the particular region on the touch sensor surface; and store these vibration cycles into a vibration image corresponding to the particular region on the touch sensor surface. Furthermore, the touch sensor can execute the calibration cycle according to the method S100 in order to: generate a set of vibration images, each vibration waveform in the set of vibration images corresponding to an input on a particular region on the touch sensor surface; and define vibration cycles in the vibration images for each haptic feedback module—such as waveforms of a particular amplitude, phase offset, and frequency—in order to deliver a target haptic feedback intensity to the particular region on the touch sensor surface, the vibration cycles containing information for phase offset, amplitude, and time duration for each of the haptic actuators.

The touch sensor can therefore leverage the set of vibration images generated by the method S100 in order to define a minimum haptic feedback intensity (e.g., 5 G's) across all regions on the touch sensor surface. As a result, the touch sensor can deliver a uniform haptic feedback response regardless of the location of an input applied on the touch sensor surface.

3.1 Applications: Constructive Haptic Interference

In one example, the touch sensor—in conjunction with the calibration system—can execute Blocks of the method S100 to: generate a haptics map defining a set of vibration cycles for a set of regions (e.g., 20-millimeter×20-millimeter regions) across a touch sensor surface; and output a target haptic feedback intensity at a target region (e.g., center region), in the set of regions responsive to application of touch inputs applied on the touch sensor surface. In this example, the calibration system can: apply a probe to a sequence of locations on the touch sensor surface; capture a sequence of haptic waveforms corresponding to the sequence of the locations on the touch sensor surface; fuse the sequence of haptic waveforms into a haptics response map representing haptic feedback response across the touch sensor surface during haptic feedback cycles triggered at the touch sensor; and transmit the haptics response map to the touch sensor. In this example, the touch sensor can leverage constructive haptic interference (e.g., summation of haptic waveforms) across a set of haptic actuators at the touch sensor to: identify a target phase offset (or "delay") across the set of haptic actuators corresponding to a maximum haptic intensity output; and store this target phase offset in the haptics map for a target region on the touch sensor surface. Thus, the touch sensor can, in response to interpreting a touch input at the target region on the touch sensor surface, trigger the set of haptic actuators—at the target phase offset—to deliver the maximum haptic intensity output at the target region.

The touch sensor can then: access a target haptic intensity representing a target peak-to-peak acceleration across each region, in the set of regions, for the touch sensor surface; and generate a haptics response map containing a set of vibration cycles corresponding to the set of regions on the touch sensor surface based on the target haptic intensity. In particular the touch sensor can, for each haptic waveform in the haptics response map: identify a maximum haptic intensity (e.g., peak-to-peak acceleration) in the haptic waveform; interpret a vibration cycle, such as an oscillating voltage of a particular amplitude, phase, and frequency, for a set of haptic actuators at the touch sensor based on the maximum haptic intensity; and generate a scalar coefficient for the vibration cycle based on the target haptic intensity to modify (e.g., amplify, attenuate) the maximum haptic intensity toward the target haptic intensity.

Thus, in this example the touch sensor can output a target haptic feedback response (e.g., peak-to-peak accelerations) across all regions of the touch sensor surface regardless of a location for a touch input applied on the touch sensor surface.

3.2 Applications: Destructive Haptic Interference

In another example, the touch sensor—in conjunction with the calibration system—can execute Blocks of the method S100 to: generate a haptics map defining a set of vibration cycles for a set of regions (e.g., 20-millimeter× 20-millimeter regions) across the touch sensor surface; and output a target haptic intensity at a first region, in the set of regions, responsive to application of a touch input at a target location within the first region on the touch sensor surface; and output a nullified haptic intensity across a subset of regions, in the set of regions, encompassing the first region in the touch sensor surface. Thus, the touch sensor can leverage haptic interference across a set of haptic actuators to: amplify haptic intensity at the first region on the touch sensor surface; and attenuate haptic intensity at the subset of regions on the touch sensor surface encompassing the first region.

In this example, the touch sensor can leverage destructive haptic intensity (e.g., subtraction of haptic waveforms) across the set of haptic actuators at the touch sensor to: identify a target phase offset (or "delay) across the set of haptic actuators corresponding to a minimum haptic intensity output; and store this target phase offset in the haptics map for a target region, in the subset of regions, on the touch sensor surface. Thus, the touch sensor can, in response to interpreting a touch input at the target region on the touch sensor surface, trigger the set of haptic actuators—at the target phase offset—to deliver the minimum haptic intensity output at the target region in the subset of regions.

As described above, the calibration system can then execute a calibration routine to: generate a haptics response map representing haptic feedback response across all regions of the touch sensor surface during a haptic feedback cycle; and transmit this haptics response map to the touch sensor. The touch sensor can then: generate a haptics map defining a first vibration cycle to induce the target haptic intensity at the first region on the touch sensor surface; and a second set of vibration cycles to induce the nullified haptic intensity across the subset of regions on the touch sensor surface.

4. Touch Sensor

Generally, the touch sensor includes: a substrate; a cover layer arranged above the substrate and defining a touch sensor surface; a touch sensor layer interposed between a top side of the substrate and the cover layer; a force sensor layer arranged below a bottom side of the substrate; and a controller configured to read electrical signals (e.g., voltages) from the touch sensor layer and the force sensor layer. The touch sensor layer includes a first array of drive and sense electrode pairs patterned across the touch sensor layer defining a touch input sensor. The force sensor layer includes a second array of drive and sense electrode pairs patterned across the force sensor layer defining a force input sensor.

In this configuration, application of a localized force to the touch sensor surface drives sense electrodes in the force sensor layer into contact with drive electrodes in the force sensor array to: reduce an electrode gap between sense electrodes and drive electrodes in the second array of drive and sense electrode pairs; and decrease the resistances across these drive and sense electrode pairs (e.g., manifesting as increased voltages at the sense electrodes when the drive electrodes are driven to a reference potential) as a function of (e.g., proportional to) the magnitude of the applied force.

Accordingly, the controller is configured to: drive the first array of drive and sense electrode pairs (e.g., to a reference potential); read a first set of electrical values from the array of sense electrodes in the first array of drive and sense electrode pairs; and interpret a touch input applied at a particular location on the touch sensor surface based on differences between the first set of electrical values from baseline touch electrical values at the touch sensor. The controller is also configured to: drive the second array of drive and sense electrode pairs (e.g., to a reference potential); read a second set of electrical values from the array of sense electrodes in the second array of drive and sense electrode pairs; and interpret a force magnitude for the touch input applied at the particular location on the touch sensor surface based on differences between the second set of electrical values from baseline force electrical values at the touch sensor.

The touch sensor can also include: a haptic actuator (e.g., magnet+coil, LRA, piezo, ERM, solenoids) arranged below the substrate; and configured to oscillate the touch sensor surface. Accordingly, the controller is also configured to, in response to application of a target force magnitude (e.g., 200 gram-force) on the touch sensor surface, trigger the haptic actuator to oscillate the touch sensor surface of the touch sensor. In one example, the haptic actuator includes: a magnetic element arranged below the substrate; and a set of inductor layers arranged within the substrate and defining a multi-layer inductor facing the magnetic element and configured to magnetically couple the magnetic element to oscillate the touch sensor surface. Accordingly, the calibration system can: apply a sequence of target force magnitudes (e.g., varying force magnitudes) at the touch sensor surface; induce haptic feedback responses (e.g., deep-click response, double click response, click response) at the touch sensor according to the applied target force magnitudes; and measure haptic feedback output from the touch sensor during execution of the haptic feedback cycles.

4.1 Touch Sensor: Multiple Haptic Actuators

In one implementation, the touch sensor: includes a set of haptic actuators (e.g., 2, 4) arranged below the touch sensor surface; and can trigger an oscillating voltage across the set of haptic actuators to induce oscillations across the touch sensor responsive to application of touch inputs on the touch sensor surface.

In one example, the touch sensor includes: a first haptic actuator arranged proximal a first lateral edge of the touch sensor; and a second haptic actuator arranged proximal a second lateral edge, opposite the first lateral edge, of the touch sensor. The touch sensor can then, responsive to application of a touch input on the touch sensor surface: trigger a first oscillating voltage at the first haptic actuator; and trigger a second oscillating voltage, matching the first oscillating voltage, at the system haptic actuator. In this example, triggering the first oscillating voltage and the second oscillating voltage simultaneously across the set of haptic actuators results in non-uniform haptic output across the touch sensor surface during a haptic feedback cycle. Thus, as described below, the touch sensor can—in conjunction with the calibration system—generate a vibration cycle for a target location on the touch sensor surface defining: a first oscillating voltage for a first haptic actuator; and a second oscillating voltage, different from the first oscillating voltage (e.g., different amplitudes, phase, frequency), to induce a target haptic feedback response across a first region on the touch sensor surface. The touch sensor can then repeat this process to generate vibration cycles for all regions across the touch sensor surface to achieve uniform haptic feedback response.

5. Calibration System

In one implementation, the calibration system includes: a control module; a touch sensor receptacle configured to receive and locate the touch sensor; a probe; a boom supporting the probe and configured to drive the probe toward the touch sensor surface of the touch sensor; an actuation subsystem configured to scan the probe laterally and longitudinally across the touch sensor surface; and a force (or "pressure") sensor configured to detect a force magnitude of the probe applied normal to the touch sensor surface.

In this implementation, the calibration system: further includes a vibration sensor arranged within the probe; and can read a timeseries of vibration values from the vibration sensor responsive to driving an oscillating voltage across the set of haptic actuators in the touch sensor. Thus, the calibration system can then generate a haptic waveform, such as representing peak-to-peak accelerations across the touch sensor surface, based on the timeseries of vibration values from the vibration sensor. In one example, the first haptic waveform represents an oscillating signal: defined by an amplitude (e.g., of peak-to-peak accelerations), a particular phase, and a particular frequency; and representing haptic feedback across a touch sensor surface responsive to triggering a set of haptic actuators at the touch sensor.

In another implementation, the calibration system: further includes an audio sensor (e.g., microphone) arranged proximal (e.g., coupled to) the probe; and can read a timeseries of electrical values (e.g., representing changes in vibrations in the air) responsive to driving an oscillating voltage across the set of haptic actuators at the touch sensor. Thus, the calibration system can then generate an audio waveform, based on the timeseries of electrical values representing audible feedback across an atmospheric medium based on the timeseries of electrical values. In one example, the audio waveform; is defined by a particular volume level (e.g., in decibels) and a particular frequency; and represents audible feedback generated from triggering the set of haptic actuators at the touch sensor.

5.1 Probe

In one implementation, the probe defines a rigid, flat, circular contact surface approximately one square centimeter in area. In another implementation, the probe includes a silicone depressor defining a geometry approximating an adult human index finger. In yet another implementation, the probe defines a tapered geometry approximating a writing stylus.

5.2 Control Module

Blocks of the method S100 recite, at a calibration system, applying a probe, at a target selection force, to a first target location on a touch sensor surface in Block S120. Generally, the calibration system can: receive a touch sensor at the touch receptacle, such as by manually receiving the touch sensor by a user interacting with the calibration system and/or receive the touch sensor by a robotic arm maneuvering the touch sensor; and initiate a calibration routine in response to confirming presence of a touch sensor at the touch sensor receptacle. In particular, during the calibration routine, the calibration system drives the probe to couple (e.g., contact) a first location on the touch sensor surface at a target selection force corresponding to a threshold force for triggering a sequence of vibration cycles at the touch sensor to oscillate the touch sensor surface. The calibration system can then repeat this process across all locations on the touch sensor surface to measure haptic feedback response at the touch sensor surface during the sequence of vibration cycles.

In one implementation, during the calibration routine, the touch sensor can: trigger the sequence of vibration cycles in response to receipt of a calibration command from the calibration system; download a magnitude of the target selection force; and download a magnitude of peak-to-peak acceleration of the target haptic intensity. The calibration system can then: read a set of electrical values from the vibration sensor arranged within the probe; and generate the haptic waveform representing peak-to-peak accelerations at the target location on the touch sensor surface based on the set of electrical values. The touch sensor can then: interpret the vibration cycle based on the haptic waveform and the magnitude of peak-to-peak acceleration; and store the vibration cycle in a region, within a haptics leveling map, representing the target location on the touch sensor surface.

Therefore, the touch sensor can transmit the haptics leveling map to an external computer system, such as to the calibration system and/or a remote computer system. The computer system can then disseminate the haptics leveling map across a set of touch sensors for implementation during a future deployment and/or test period.

5.3 Multiple Probes

In one variation, the calibration system includes multiple discrete and offset probes, each supported by one boom (e.g., one linear actuator) and coupled to one force (or pressure) sensor. In this variation, the calibration system can implement the foregoing methods and techniques to concurrently drive the set of probes into contact with the touch sensor surface at the target selection force, such as along contiguous segments of the calibration path or at discrete groups of waypoints across the touch sensor surface. For example, the calibration system can include ten probes located at a common, fixed pitch distance spanning the width of the touch sensor surface; accordingly, the calibration system can simultaneously sweep the ten probes linearly along a single, contiguous linear calibration path across the touch sensor surface.

6. Calibration Routine

Generally, the touch sensor can—in conjunction with the calibration system—execute Blocks of the method S100 to: initiate a calibration routine for a touch sensor received at the calibration system; and generate a haptics leveling map to modify (e.g., amplify, attenuate) haptic feedback response across regions of the touch sensor surface. In particular, the calibration system: generates a haptics response map representing haptic feedback response across regions of the touch sensor surface; and transmits the haptics response map to the touch sensor. The touch sensor can then generate the haptics leveling map for the set of haptic actuators based on the haptics response map and a target haptic intensity. Thus, following termination of the calibration routine, the touch sensor can: store the haptics leveling map in local memory; and retrieve the haptics leveling map from local memory during operation to achieve targeted haptic feedback response across regions of the touch sensor surface.

6.1 Target Haptic Intensity

Blocks of the method S100 recite, accessing a target haptic intensity across a touch sensor surface of a touch sensor during a haptic feedback cycle in Block S110. Generally, the touch sensor can access a target haptic intensity, such as from the calibration system and/or a remote calibration system, representing a target haptic feedback response for a first region or multiple regions across the touch sensor surface. In particular, the target haptic intensity can correspond to a haptic intensity between a nullified haptic intensity (e.g., 0.5-1 peak-to-peak acceleration) and a maximum haptic intensity (e.g., 5-6 peak-to-peak acceleration). Thus, the touch sensor can generate a vibration cycle to increase and/or attenuate haptic feedback across regions of the touch sensor surface.

In one implementation, the touch sensor can access a target haptic intensity map representing a set of regions across the touch sensor surface. In this implementation, each region in the set of regions defines a peak-to-peak haptic intensity. The touch sensor can then, during a first calibration period in the set-up period, extract a first peak-to-peak haptic intensity from a first region, in the set of regions, encompassing the first target location on the touch sensor surface. Therefore, the target haptic intensity map can define: uniform haptic feedback response across all regions of the touch sensor surface; and/or targeted haptic feedback response across a subset of regions, in a set of regions, on the touch sensor surface.

6.2 Capturing Haptic Waveform

Blocks of the method S100 recite: at the touch sensor, triggering a sequence of vibration cycles across a set of haptic actuators to oscillate the touch sensor surface in Block S130; capturing a first haptic waveform representing oscillations at the first target location on the touch sensor surface during the sequence of vibration cycles in Block S140; and storing the first haptic waveform in a haptics response map in Block S142.

Generally, the calibration system can: record a timeseries of electrical values from a vibration sensor arranged within the probe proximal the target location on the touch sensor surface; and generate a haptic waveform representing haptic feedback response at the target location based on the timeseries of electrical values. In particular, the haptic waveform can represent peak-to-peak accelerations interpreted across a region proximal the first location on the touch sensor surface. Thus, the touch sensor can: repeat this process for a set of locations across the touch sensor surface to generate a sequence of haptic waveforms; and store the sequence of haptic waveforms within a haptics response map representing the touch sensor surface.

6.2.1 Haptic Response Map

In one implementation, during the calibration routine, the calibration system can: initialize a haptics response map; and trigger the probe to couple (e.g., contact) a target location on the touch sensor surface of the touch sensor. Subsequently, the touch sensor can then trigger a sequence of vibration cycles across the set of haptic actuators to oscillate the touch sensor surface. The calibration system can then: capture a first set of vibration values from a vibration sensor arranged at the probe proximal the target location; generate a haptic waveform representing oscillations at the target location on the touch sensor surface during the sequence of vibration cycles; and store the haptic waveform in a first region of the haptics response map encompassing the target location on the touch sensor surface.

The calibration system can then: repeat this process for a set of target locations defined for the touch sensor surface; populate each region in the haptics response map with a corresponding haptic waveform recorded by the calibration system; and transmit the populated haptics response map to the touch sensor and/or to an external device (e.g., remote calibration system).

6.3 Constructive Haptic Interference

Blocks of the method S100 recite, interpreting a first vibration cycle for the set of haptic actuators corresponding to the target haptic intensity at the first target location based on the first haptic waveform in Block S150. Generally, the touch sensor can leverage haptic interference across the touch sensor surface resulting from driving a set of haptic actuators at the touch sensor to amplify haptic intensity at a target location on the touch sensor surface. In particular the touch sensor can: sweep (e.g., continuously, discretely) a sequence of vibration cycles (e.g., of varying amplitude, phase, frequency) to oscillate the touch sensor surface at varying degrees of haptic interference; and receive a haptic waveform representing a haptic feedback response (e.g., peak-to-peak acceleration) at the target location from the calibration system. The touch sensor can thus, interpret a vibration cycle based on the haptic waveform for the set of haptic actuators to induce an amplified haptic intensity at the target location.

In one implementation, the touch sensor can: identify a maximum peak-to-peak intensity in a first haptic waveform; and generate a vibration cycle according to the maximum peak-to-peak intensity and drive an oscillating voltage according to the vibration cycle at the set of haptic actuators to oscillate the target location at the maximum peak-to-peak intensity. The touch sensor can then: repeat this process for each location, in a sequence of locations, of the touch sensor surface; generate a sequence of vibration cycles associated with oscillating regions of the touch sensor surface at the maximum peak-to-peak intensity; and store the sequence of vibration cycles in a haptics leveling map.

Therefore, the touch sensor can: detect a touch input on the touch sensor surface; and trigger a haptic feedback cycle to oscillate the touch sensor surface at a maximum peak-to-peak intensity regardless of the location of the touch input on the touch sensor surface.

6.3.1 Modifying Voltage

In one implementation, during the calibration period, the touch sensor can: trigger a sequence of vibration cycles corresponding to sweeping (e.g., continuously, discretely) voltage amplitude across the set of haptic actuators, at the touch sensor; and receive a haptic waveform from the calibration system representing haptic feedback response during sweeping of voltage amplitude across the set of haptic actuators in the calibration period. In this implementation, the touch sensor can then: generate a vibration cycle defined by a particular voltage offset across a set of haptic actuators; and, during operation, drive the particular voltage offset across the set of haptic actuators to oscillate the target location at the target haptic intensity responsive to application of a touch input over the touch sensor surface.

In one example, the touch sensor can: sweep (e.g., continuously, discretely) from a baseline voltage to a threshold voltage—offset from the baseline voltage—at a first haptic actuator, in the set of haptic actuators; and sweep from the threshold voltage to the baseline voltage at a second haptic actuator, in the set of haptic actuators. In this example, the touch sensor can then: identify a first peak-to-peak haptic intensity, in the first haptic waveform, corresponding to the target haptic intensity; interpret a first target voltage between the baseline voltage and the threshold voltage for the first haptic actuator associated with the first peak-to-peak haptic intensity; and interpret a second target voltage, different from the first target voltage, between the baseline voltage and the threshold voltage for the second haptic actuator associated with the first peak-to-peak haptic intensity. Thus, the touch sensor can generate the first vibration cycle associated with the first target location on the touch sensor surface defined by the first target voltage and the second target voltage.

Therefore, responsive to application of a touch input at the first location on the touch sensor surface, the touch sensor can: drive the first haptic actuator according to the first target voltage in the first vibration cycle; and drive the second haptic actuator according to the second target voltage in the first vibration cycle. The second haptic actuator cooperates with the first haptic actuator to oscillate the first target location at the target haptic intensity. The system can further: repeat this process for each location in the sequence of locations to generate a sequence of vibration cycles; and store the sequence of vibration cycles in a haptics leveling map.

6.3.2 Modifying Frequency

In one implementation, during the calibration period, the touch sensor can: trigger a sequence of vibration cycles corresponding to sweeping (e.g., continuously, discretely)

frequency values across the set of haptic actuators, at the touch sensor; and receive a haptic waveform from the calibration system representing haptic feedback response during sweeping of frequency values across the set of haptic actuators in the calibration period. In this implementation the touch sensor can then: generate a vibration cycle defined by a particular frequency offset across the set of haptic actuators; and, during operation, drive a target oscillating voltage, at the particular frequency offset, across the set of haptic actuators to oscillate the target location at the target haptic intensity responsive to application of the touch input over the touch sensor surface.

In one example, the touch sensor can: sweep (e.g., continuously, discretely) a target oscillating voltage from a baseline frequency to a threshold frequency—offset from the baseline frequency—at a first haptic actuator in the set of haptic actuators; and sweep the target oscillating voltage from the threshold frequency to the baseline frequency at a second haptic actuator, in the set of haptic actuators. In this example, the touch sensor can then: identify a first peak-to-peak haptic intensity, in the first haptic waveform, corresponding to the target haptic intensity; interpret a first target frequency, between the baseline frequency and the threshold frequency, for the first haptic actuator associated with the first peak-to-peak haptic intensity; and interpret a second target frequency, different form the first target frequency and between the baseline frequency and the threshold frequency, for the second haptic actuator associated with the first peak-to-peak haptic intensity. Thus, the touch sensor can generate the first vibration cycle associated with the first target location on the touch sensor surface defined by the first target frequency and the second target frequency.

Therefore, responsive to application of a touch input at the first location on the touch sensor surface, the touch sensor can: drive the first haptic actuator at the target oscillating voltage and at the first target frequency; and drive the second haptic actuator at the target oscillating voltage and at the second target frequency. The second haptic actuator cooperates with the first haptic actuator to oscillate the first target location at the target haptic intensity. The touch sensor can further: repeat this process for each location in the sequence of locations to generate a sequence of vibration cycles; and store the sequence of vibration cycles in a haptics leveling map.

6.3.3 Haptic Actuator Delay

In one implementation, during the calibration period, the touch sensor can: trigger a sequence of vibration cycles corresponding to sweeping phase offset (or "time delay") for a target oscillating voltage across the set of haptic actuators; and receive a haptic waveform from the calibration system representing haptic feedback response during sweeping of phase offset across the set of haptic actuators during the calibration period. In this implementation, the touch sensor can: identify a first peak-to-peak haptic intensity, in the first haptic waveform, corresponding to the target haptic intensity; interpret a first phase offset across the set of haptic actuators associated with the first peak-to-peak haptic intensity; and generate the first vibration cycle associated with the first target location on the touch sensor surface including the first phase offset. During operation, the system can then, drive the target oscillating voltage, at the first phase offset, across the set of haptic actuators to oscillate the target location at the target haptic intensity responsive to application of the touch input over the touch sensor surface.

In one example, the touch sensor can identify a first duration of time (or "time delay") between driving the target oscillation voltage to a first haptic actuator and a second haptic actuator associated with the first peak-to-peak intensity. The touch sensor can then: at the first time, drive the target oscillating voltage to the first haptic actuator; and at a second time, following the first duration of time, drive the target oscillating voltage to the second haptic actuator to oscillate the first target location at the target haptic intensity. The touch sensor can further: repeat this process for each location in the sequence of locations to generate a sequence of vibration cycles; and store the sequence of vibration cycles in a haptics leveling map.

In the aforementioned implementation, the touch sensor can then: calculate a first scalar coefficient (e.g., current scalar coefficient) based on a ratio of the first peak-to-peak haptic intensity and a target peak-to-peak haptic intensity defined by the target haptic intensity; and generate the first vibration cycle associated with the first target location on the touch sensor surface defined by the first phase offset and the first scalar coefficient (e.g., current scalar coefficient). During operation, the system can drive the target oscillating voltage—to the set of haptic actuators—according to the first scalar coefficient (e.g., current scalar coefficient) and at the first phase offset to oscillate the first target location on the touch sensor surface. The touch sensor can further: repeat this process for each location in the sequence of locations to generate a sequence of vibration cycles; and store the sequence of vibration cycles defined by a target phase offset (or "time delay") and a target scalar coefficient (e.g., current scalar coefficient) in a haptics leveling map.

6.3.3.1 Delay Function

In one implementation, the touch sensor can: generate a target phase offset function between a first location and a second location, adjacent the first location, on the touch sensor surface; and, in response to identifying a touch input at a third location interposed between the first location and the second location, calculate a target phase offset for the third location based on the target phase offset function. Thus, the touch sensor can: repeat this process across each target location, in the set of target locations, on the touch sensor surface; and generate a global function and/or a system of functions (e.g., parametric function) to identify a target phase offset for a target location on the touch sensor surface that induces a haptic feedback response at the target haptic intensity.

In one example, the touch sensor can: extract a first phase offset from the haptics leveling map corresponding to the first location; extract a second phase offset from the haptics leveling map corresponding to the second location, linearly offset (e.g., longitudinally, laterally) from the first location; and calculate a scalar coefficient for a region on the touch sensor surface across the first location and the second location. The touch sensor can thus: generate a phase offset function (e.g., linear function) based on the scalar coefficient; and calculate a target phase offset for touch inputs detected between the first location and the second location. Additionally or alternatively, the touch sensor can implement machine learning techniques (e.g., adversarial neural network) to interpret a phase offset function for calculating a target phase for a target location on the touch sensor surface that induces haptic feedback response at the target haptic intensity.

6.3.4 Haptics Leveling Map

Blocks of the method S100 recite, during the set-up period, generating a haptics leveling map defining vibration cycles for oscillating the touch sensor surface at the target haptic intensity based on the haptics response map in Block S160.

Generally, the touch sensor can: generate a haptics leveling map containing a set of vibration cycles for achieving a target haptic intensity across the touch sensor surface; and implement this haptics leveling map during operation of the touch sensor to retrieve a particular vibration cycle corresponding to a particular region on the touch sensor surface. In one implementation, during the set-up period, the touch sensor can: initialize a haptics leveling map representing a set of regions across the touch sensor surface; and store a first vibration cycle at a first region, in the set of regions, in the haptics leveling map corresponding to an area encompassing a first target location on the touch sensor. The touch sensor can then: repeat this process to generate a set of vibration cycles corresponding to a set of regions across the touch sensor surface; populate the haptics leveling map based on the set of vibration cycles; and store the haptics leveling map in local memory.

Thus, during operation, the touch sensor can then: retrieve the haptics leveling map; identify the first touch input located within the first region on the haptics leveling map; and, in response to a first force magnitude of the first touch input exceeding the target selection force, trigger the first vibration cycle in the haptics leveling map for the set of haptic actuators to oscillate the touch sensor surface at the target haptic intensity.

In one example, during the set-up period, the touch sensor can: initialize a haptics leveling map representing a set of regions across the touch sensor surface; and store a particular phase offset and a particular scalar coefficient (e.g., current scalar coefficient) in a first region, in the set of regions, of the haptics leveling map. The touch sensor can then: repeat this process to generate a set of vibration cycles corresponding to a set of regions across the touch sensor surface; populate the haptics leveling map based on the set of vibration cycles; and store the haptics leveling map in local memory. In this example, each vibration cycle in the set of vibration cycles, is defined by a particular phase offset and a particular scalar coefficient (e.g., current scalar coefficient).

Thus, during operation, the touch sensor can: retrieve the haptics leveling map; and identify a target location of a touch input corresponding to the first region in the haptics leveling map. The touch sensor can then, in response to identifying the first target location of the first touch input: at a first time, drive an oscillating voltage at the first scalar coefficient (e.g., current scalar coefficient) to a first haptic actuator; and, at a second time, following the first phase offset, driving the oscillating voltage at the first scalar coefficient (e.g., current scalar coefficient) to the second haptic actuator to oscillate the first target location on the touch sensor surface.

6.4 Destructive Haptic Interference

In another implementation the touch sensor can leverage haptic interference induced across the touch sensor surface to nullify haptic feedback response at a particular region and/or a set of regions on the touch sensor surface. In this implementation, the touch sensor can: access a target haptic intensity corresponding to a nullified haptic feedback response (e.g., 0.5-2 G's); and implement the steps described above to generate a vibration cycle corresponding to a particular region on the touch sensor surface that achieves the nullified haptic feedback response. Further, the system can generate a haptics leveling map, as described above, containing a sequence of vibration cycles corresponding to a set of regions on the touch sensor surface that achieve the nullified haptic feedback response.

In one implementation, during the set-up period, the touch sensor can: initialize a haptics leveling map representing a set of regions across the touch sensor surface; and store a first vibration cycle at a first region, in the set of regions, in the haptics leveling map corresponding to an area encompassing a first target location on the touch sensor. During the set-up period, the touch sensor can further: extract a second peak-to-peak haptic intensity from a second region, in a target haptic intensity map, encompassing a second target location on the touch sensor surface. In this implementation, the second peak-to-peak haptic intensity is less than the first peak-to-peak haptic intensity in order to attenuate haptic feedback responses encompassing the first region.

In one example, during the set-up period, the calibration system: applies the probe, at the target selection force, to the second target location on the touch sensor surface. The touch sensor can then: trigger the sequence of vibration cycles across the set of haptic actuators to oscillate the touch sensor surface; capture a second haptic waveform representing oscillations at the second target location on the touch sensor surface during the sequence of vibration cycles; and interpret a second vibration cycle for the set of haptic actuators corresponding to the second peak-to-peak haptic intensity at the second target location based on the second haptic waveform. In this example, the second peak-to-peak haptic intensity corresponds to a nullified haptic intensity to attenuate haptic feedback within a second region proximal the first region on the touch sensor surface. The system can then: repeat this process to generate a set of vibration cycles corresponding to a subset of regions across the touch sensor surface encompassing the first region; populate the haptics leveling map based on the set of vibration cycles; and store the haptics leveling map in local memory.

During operation, the touch sensor can, in response to detecting a second touch input proximal the second target location on the touch sensor surface, trigger the second vibration cycle at the set of haptic actuators to oscillate the second target location at the second peak-to-peak haptic intensity less than the first peak-to-peak haptic intensity. Therefore, the touch sensor can leverage haptic interference induced across the touch sensor surface responsive to triggering the set of haptic actuators to nullify haptic feedback response across a set of target regions on the touch sensor surface.

6.5 Multiple Haptic Actuators

In one implementation, the touch sensor: includes an array of haptic actuators (e.g., 3, 6, 10) arranged below the touch sensor surface; and induces haptic interferences across the touch sensor surface responsive to triggering the array of haptic actuators during a haptic feedback cycle. In this implementation, the system can: generate a set of haptics leveling maps corresponding to subsets of haptic actuators (e.g., 2 haptic actuators) in the array of haptic actuators; and, in response to a first touch input located within a first region in the touch sensor surface spanning a first subset of haptic actuators, access a haptics leveling map, in the set of haptics leveling maps, corresponding to the first region. Additionally or alternatively, the touch sensor can implement Blocks of the method S100, as described above, to generate a global haptics leveling map entirely spanning the touch sensor surface of the touch sensor.

7. Touch Sensor Operation

Blocks of the method S100 recite: at a first time, capturing a first touch image representing magnitudes of forces detected on the touch sensor surface; interpreting a first force magnitude for a first touch input applied proximal the first target location on the touch sensor surface based on the first touch image in Block S170; and, in response to the first force magnitude exceeding the target selection force, triggering the first vibration cycle at the set of haptic actuators to oscillate the touch sensor surface at the target haptic intensity in Block S180.

Generally, during operation, the touch sensor can: detect touch inputs applied on the touch sensor surface; and or detect force inputs applied on the touch sensor surface. In particular, as described above, the touch sensor can: read electrical values from drive and sense electrode pairs at the touch sensor; and interpret touch inputs and/or force inputs applied over the touch sensor surface based on deviation of the electrical values from baseline electrical values stored in memory of the touch sensor surface.

In one implementation, the touch sensor can: access the haptics leveling map from memory; read a first set of electrical values from drive and sense electrode pairs at the touch sensor arranged below the touch sensor surface; and interpret a location for a first touch input applied at the touch sensor surface based on the first set of electrical values deviating from baseline electrical values. In this implementation, the touch sensor can then: identify a first region in the haptics leveling map encompassing the first location of the first input; extract a first vibration cycle for a set of haptic actuators at the touch sensor from the haptics leveling map; and drive the set of haptic actuators according to the first vibration cycle to oscillate the first region at the touch sensor surface at a target haptic intensity.

Additionally or alternatively, the touch sensor can: read a second set of electrical values from an array of force sensors (e.g., pressure sensors, capacitive force sensors) arranged below the touch sensor surface; and interpret a force magnitude for the first touch input applied over the touch sensor surface based on deviation of the second set of electrical values from baseline electrical values. Thus, the touch sensor can then, in response to the force magnitude exceeding a threshold force magnitude, drive the set of haptic actuators according to the first vibration cycle to oscillate the first region at the touch sensor surface at a target haptic intensity.

Therefore, the touch sensor can: retrieve the haptics leveling map from local memory during operation; and implement the haptics leveling map to achieve targeted and/or uniform haptic feedback response across the touch sensor surface responsive to application of touch inputs and/or force inputs on the touch sensor surface.

8. Variation: Uniform Haptic Feedback Response

In one implementation, the method S100 can be implemented to generate a vibration template to deliver uniform haptic feedback response across all regions on the touch sensor surface. As described above—for a touch sensor including a first haptic feedback module and a second haptic feedback module—simultaneously triggering a vibration cycle for each of the modules will result in certain regions across the touch sensor surface exhibiting haptic interference (e.g., diminished haptic feedback intensity). Therefore, the method S100 can be implemented to generate a vibration template that defines a minimum haptic feedback intensity across all regions on the touch sensor surface to ensure a uniform haptic feedback response for a touch input regardless of the location of the touch input on the touch sensor surface.

For example, the method S100 can include: for a calibration region (e.g., 1 cm grid) in a set of calibration regions on a surface of the touch sensor, applying a calibration input of a predefined force magnitude at the calibration region; triggering a first sequence of vibration cycles for a first haptic feedback module and a second sequence of vibration cycles for a second haptic feedback module in order to oscillate the touch sensor surface; and recording a set of haptic feedback intensities (e.g., waveforms, peak to peak accelerations, acoustics) at the calibration region for each vibration cycle in the sequence of vibration cycles. In this implementation, the first sequence of vibration cycles and the second sequence of vibration cycles incrementally adjust phase offset (e.g., increments of 0.1 milliseconds) sweeping from a predetermined phase offset range (e.g., −2.5 milliseconds to 2.5 milliseconds). The touch sensor can then record a set of haptic feedback intensities for each calibration region on the touch sensor surface to observe how varying phase off-set determines haptic feedback intensity for the calibration region.

Additionally, the method S100 can include selecting a minimum haptic feedback intensity for the calibration region based on the set of haptic feedback intensities, and interpreting: a first vibration cycle for the first haptic feedback module defining a first amplitude, a first phase off-set, and a first-time duration based on the selected minimum haptic feedback intensity; and a second vibration cycle for the second haptic feedback module defining a second amplitude, a second phase off-set, and a second-time duration based on the selected minimum haptic feedback intensity. In this implementation, the controller can define a minimum haptic feedback intensity across all regions on the touch sensor surface. Therefore, a touch input applied to the touch sensor surface does not experience a haptic feedback intensity below the defined minimum haptic feedback intensity. Furthermore, the controller can then interpret a first vibration cycle for the first haptic feedback module that cooperates with a second vibration cycle for the second haptic feedback module in order to achieve a haptic feedback intensity for the calibration region that is equal to or greater than the minimum haptic feedback intensity.

The method S100 can further include: generating a first vibration image corresponding to the calibration region, the first vibration image containing the first vibration cycle for the first haptic feedback module and the second vibration cycle for the second haptic feedback module; and storing the first vibration image into a first vibration template for the touch sensor. The controller can repeat this calibration process for all calibration regions on the touch sensor surface to generate a first set of vibration images corresponding to the set of calibration regions on the touch sensor surface. Furthermore, the controller can then compile the first set of vibration images into a vibration template defining a minimum haptic feedback intensity response for a touch input on the touch sensor surface regardless of the location of the touch input on the touch sensor surface.

During operation of the touch sensor, the controller can access the vibration template containing a set of vibration images corresponding to a set of regions on the touch sensor surface. Further, in response to interpreting a force input exceeding a threshold force at a first region in the set of regions, the controller can: access a first vibration image from the set of vibration images corresponding to the first region on the touch sensor surface; trigger a first vibration cycle for a first haptic feedback module defined by the first vibration image; trigger a second vibration cycle for a second haptic feedback module defined by the first vibration image, the first vibration cycle cooperating with the second vibration cycle to deliver a target haptic feedback intensity to the first region on the touch sensor surface.

9. Variation: Temperature Calibration

In one implementation, the method S100 can generate vibration templates for particular temperature conditions of the touch sensor. During operation of the touch sensor, the touch sensor can be exposed to environmental temperature changes that can inadvertently modify haptic feedback intensity experienced on the touch sensor surface. Therefore, the touch sensor in collaboration with the calibration system can execute the method S100 to generate vibration templates to deliver uniform haptic feedback response for a particular operating temperature condition. For example, the method S100 can include, for a first calibration routine, applying a predetermined temperature to the touch sensor corresponding to a particular operating temperature condition. As described above, the touch sensor can then, generate a vibration template for delivering uniform haptic feedback intensity across all regions on the touch sensor surface for the particular operating temperature condition.

During operation of the touch sensor, the touch sensor can: read a first temperature value from a temperature sensor coupled to the touch sensor; interpret a first operating temperature condition of the touch sensor from the first temperature value; and access a first vibration template from a set of vibration templates corresponding to the first operating temperature condition of the touch sensor. The touch sensor can then, in response to interpreting a force input exceeding a threshold force at a first region in the set of regions: access a first vibration image from a first set of vibration images in the first vibration template corresponding to the first region on the touch sensor surface; trigger a first vibration cycle for a first haptic feedback module defined by the first vibration image; and trigger a second vibration cycle for a second haptic feedback module defined by the first vibration image, the first vibration cycle cooperating with the second vibration cycle to deliver a target haptic feedback intensity to the touch sensor surface.

10. Variation: Palm Input Calibration

In one implementation, the method S100 can generate vibration templates for particular palm input conditions applied to the touch sensor surface. During operation of the touch sensor, the touch sensor can: read a first set of electrical values from drive and sense electrode pairs patterned across a substrate; and interpret a touch input for a particular region on the touch sensor surface and a palm input for a set of regions on the touch sensor surface based on the electrical values. In this implementation, the force magnitude applied to the touch sensor by the palm input can inadvertently modify haptic feedback intensity across regions on the touch sensor surface. Therefore, the touch sensor in collaboration with the calibration system can execute the method S100 to generate vibration templates to deliver uniform haptic feedback response for a particular palm input condition on the touch sensor surface. For example, the method S100 can include, for a first calibration routine, applying a probe to a first set of calibration regions on a touch sensor surface corresponding to a particular palm input condition for the touch sensor. As described above, the touch sensor can then, generate a vibration template for delivering uniform haptic feedback intensity across all regions on the touch sensor surface for the particular palm input condition.

During operation of the touch sensor, the touch sensor can: read a first set of electrical values from a first set of drive and sense electrode pairs patterned across a substrate for the touch sensor; detect a first palm input across a first set of regions on a touch sensor surface of the touch sensor based on the first set of electrical values; interpret a first palm input condition based on the first palm input detected on the touch sensor surface; and access a first vibration template from a set of vibration templates corresponding to the first palm input condition. The touch sensor can then, in response to interpreting a force input exceeding a threshold force at a first region: access a first vibration image from a first set of vibration images in the first vibration template corresponding to the first region on the touch sensor surface; trigger a first vibration cycle for a first haptic feedback module defined by the first vibration image; and trigger a second vibration cycle for a second haptic feedback module defined by the first vibration image, the first vibration cycle cooperating with the second vibration cycle to deliver a target haptic feedback intensity to the touch sensor surface.

11. Variation: Targeted Haptic Feedback Response

In one implementation, the method S100 can be implemented to generate a vibration template to deliver a targeted haptic feedback response for a particular region on the touch sensor surface. As described above, for a touch sensor including a first haptic feedback module and a second feedback module, simultaneously triggering a vibration cycle for each of the modules will result in certain regions across the touch sensor surface exhibiting haptic interference (e.g., diminished haptic feedback intensity). Therefore, the method S100 can be implemented to generate a vibration template to leverage regions of haptic interference on the touch sensor surface in order to deliver a targeted haptic feedback intensity to a particular region on the touch sensor surface, while simultaneously attenuating haptic feedback intensities for regions surrounding the particular region on the touch sensor surface. As described above for the Blocks of method S100, the touch sensor in collaboration with the calibration system can execute a first calibration routine to generate a vibration image for a particular region on the touch sensor surface to deliver a targeted haptic feedback intensity at the particular region on the touch sensor surface. The touch sensor in collaboration with the calibration system can then execute a second calibration routine to generate a set of vibration images for a set of regions proximal the particular region in order to attenuate haptic feedback intensity in the set of regions.

For example, the method S100 can include: for a set of calibration regions (e.g., 1 cm grids) proximal a particular region on a surface of the touch sensor, applying a calibration input of a predefined force magnitude for each calibration region in the set of calibration regions; triggering a first sequence of vibration cycles for a first haptic feedback module and a second sequence of vibration cycles for a second haptic feedback module in order to oscillate the touch sensor surface; and recording a set of haptic feedback intensities (e.g., waveforms, peak to peak accelerations, acoustics) at each calibration region in the set of calibration regions during triggering of the first sequence of vibration cycles. In this implementation, the first sequence of vibration cycles and the second sequence of vibration cycles incrementally adjust: voltage amplitude (e.g., increments of 0.5 volts), phase offset (e.g., increments of 0.1 milliseconds), and time duration. The first sequence of vibration cycles sweeps through predetermined ranges for each of these parameters. The touch sensor can then record a set of haptic feedback intensities for the set of calibration regions proximal the particular region on the touch sensor surface to observe how varying phase off-set determines haptic feedback interference for the set of calibration regions. Additionally, the method S100 can include: selecting a second target haptic feedback intensity for the set of calibration regions proximal the particular region on the touch sensor surface based on the set of haptic feedback intensities, the second target haptic feedback intensity less than the target haptic feedback intensity for the particular region; interpreting a first vibration cycle for the first haptic feedback module defining a first amplitude, a first phase off-set, and a first-time duration based on the selected second target haptic feedback intensity; and interpreting a second vibration cycle for the second haptic feedback module defining a second amplitude, a second phase off-set, and a second-time duration based on the selected second target haptic feedback intensity. Therefore, the touch sensor can trigger the first vibration cycle and the second vibration cycle to leverage haptic interference to attenuate haptic feedback response for a set of regions proximal the particular region on the touch sensor surface. The method S100 can further include: generating a first set of vibration images corresponding to the first set of calibration regions, the first set of vibration images containing the first vibration cycle for the first haptic feedback module and the second vibration cycle for the second haptic feedback module; and storing the first set of vibration images into a first vibration template for the touch sensor, the first vibration template containing a particular vibration image corresponding to the particular region on the touch sensor surface. Therefore, the touch sensor can intentionally deliver a targeted haptic feedback intensity to a particular region on the touch sensor surface while simultaneously attenuating haptic feedback intensities for a set of regions proximal the particular region.

In one implementation, the touch sensor can operate as a seamless touch keyboard to interface with a computing device (e.g., laptop device). In this implementation, it is desirable for the touch sensor to induce a target haptic feedback intensity in response to a key input applied on a particular region on the touch sensor surface while simultaneously attenuating haptic feedback intensities for a set of regions proximal the particular region. Therefore, the touch sensor can trigger a haptic feedback cycle in response to the key input applied to the particular region that accents haptic feedback intensity for the particular region while attenuating haptic feedback intensities for regions proximal the particular region.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for modifying haptic feedback response comprising:
   during a set-up period:
      accessing a target haptic intensity across a touch sensor surface of a touch sensor during a haptic feedback cycle;
      at a calibration system, applying a probe, at a target selection force, to a first target location on a touch sensor surface;
      at the touch sensor, triggering a sequence of vibration cycles by driving a target oscillating voltage at a sequence of phase offsets across a set of haptic actuators to oscillate the touch sensor surface;
      capturing a first haptic waveform representing oscillations at the first target location on the touch sensor surface during the sequence of vibration cycles;
      identifying a first peak-to-peak haptic intensity, in the first haptic waveform, corresponding to the target haptic intensity;
      identifying a first delay between driving haptic actuators, in the set of haptic actuators, associated with the first peak-to-peak intensity; and
      generating a first vibration cycle associated with the first target location on the touch sensor surface comprising the first delay; and
   during a deployment period, following the set-up period:
      at a first time, capturing a first touch image representing magnitudes of forces detected on the touch sensor surface;
      interpreting a first force magnitude for a first touch input applied proximal the first target location on the touch sensor surface based on the first touch image; and
      in response to the first force magnitude exceeding the target selection force, triggering the first vibration cycle by driving the target oscillating voltage at the first delay between haptic actuators, in the set of haptic actuators, to oscillate the touch sensor surface at the target haptic intensity.

2. The method of claim 1:
   further comprising, during the set-up period:
      initializing a haptics leveling map representing a set of regions across the touch sensor surface; and
      storing the first vibration cycle at a first region, in the set of regions, in the haptics leveling map corresponding to an area encompassing the first target location on the touch sensor; and
   further comprising, during the deployment period:
      accessing the haptics leveling map;
      identifying the first touch input located within the first region on the haptics leveling map; and
      in response to the first force magnitude exceeding the target selection force, triggering the first vibration cycle in the haptics leveling map for the first haptic actuator to oscillate the touch sensor surface at the target haptic intensity.

3. The method of claim 2:
further comprising, during the set-up period:
- at the calibration system, applying the probe, at the target selection force, to a second target location offset from the first target location on the touch sensor surface;
- at the touch sensor, triggering the sequence of vibration cycles across the set of haptic actuators to oscillate the touch sensor surface;
- capturing a second haptic waveform representing oscillations at the second target location;
- generating a second vibration cycle, different from the first vibration cycle, for the set of haptic actuators corresponding to the target haptic intensity at the second target location based on the second haptic waveform; and
- storing the second vibration cycle at a second region, in the set of regions, in the haptics leveling map corresponding to a second area encompassing the second target location on the touch sensor; and further comprising during the deployment period;
- at a second time, reading a set of electrical values from a set of drive and sense electrode pairs in the touch sensor;
- interpreting a second touch input applied proximal the second target location on the touch sensor surface and corresponding to the second region in the haptics leveling map based on the set of electrical values; and
- in response to interpreting the second touch input, triggering the second vibration cycle in the haptics leveling map at the set of haptic actuators to oscillate the touch sensor surface at the target haptic intensity.

4. The method of claim 1:
further comprising, at the touch sensor:
- triggering the sequence of vibration cycles in response to receipt of a calibration command from the calibration system;
- downloading a magnitude of the target selection force; and
- downloading a magnitude of peak-to-peak acceleration of the target haptic intensity;

wherein capturing the first haptic waveform comprises, at the calibration system:
- reading a first set of electrical values from a vibration sensor arranged within the probe of the calibration system; and
- generating the first haptic waveform representing peak-to-peak accelerations at the first target location on the touch sensor surface based on the first set of electrical values;

wherein generating the first vibration cycle comprises, at the touch sensor, generating the first vibration cycle based on the first haptic waveform and the magnitude of peak-to-peak acceleration; and further comprising, at the touch sensor, storing the first vibration cycle in a first region, within a haptics leveling map, representing the first target location on the touch sensor surface.

5. The method of claim 1:
wherein identifying the first peak-to-peak haptic intensity in the first haptic waveform comprises identifying a maximum peak-to-peak intensity in the first haptic waveform; and wherein driving the target oscillating voltage to the set of haptic actuators comprises driving the target oscillating voltage to the set of haptic actuators at the first delay to oscillate the target location at the maximum peak-to-peak intensity.

6. The method of claim 1:
wherein generating the first vibration cycle further comprises:
- calculating a first scalar coefficient based on a ratio of the first peak-to-peak haptic intensity and a target peak-to-peak haptic intensity defined by the target haptic intensity; and
- generating the first vibration cycle associated with the first target location on the touch sensor surface comprising the first delay and the first scalar coefficient; and wherein driving the target oscillating voltage to the set of haptic actuators comprises driving the target oscillating voltage according to the first scalar coefficient and at the first phase offset to oscillate the first target location on the touch sensor surface.

7. The method of claim 6:
further comprising, during the set-up period:
- initializing a haptics leveling map representing a set of regions across the touch sensor surface; and
- storing the first delay and the first scalar coefficient in a first region, in the set of regions, of the haptics leveling map corresponding to an area encompassing the first target location on the touch sensor surface; and wherein triggering the first vibration cycle at the first haptic actuator to oscillate the touch sensor surface at the target haptic intensity comprises:
- accessing the haptics leveling map;
- identifying the first target location of the first touch input corresponding to the first region in the haptics leveling map; and
- in response to identifying the first target location of the first touch input:
  - at the first time, driving a first oscillating voltage at the first scalar coefficient to the first haptic actuator; and
  - at the second time, following the first delay, driving the target oscillating voltage at the first scalar coefficient to the second haptic actuator to oscillate the first target location on the touch sensor surface.

8. The method of claim 1:
wherein triggering the sequence of vibration cycles across the set of haptic actuators to oscillate the touch sensor surface comprises:
- sweeping from a baseline voltage to a threshold voltage, offset from the baseline voltage, at a first haptic actuator, in the set of haptic actuators; and
- sweeping from the threshold voltage to the baseline voltage at a second haptic actuator, in the set of haptic actuators; and wherein generating the first vibration cycle for the set of haptic actuators comprises:
- interpreting a first target voltage between the baseline voltage and the threshold voltage for the first haptic actuator associated with the first peak-to-peak haptic intensity;
- interpreting a second target voltage, different from the first target voltage, between the baseline voltage and the threshold voltage for the second haptic actuator associated with the first peak-to-peak haptic intensity; and generating the first vibration cycle associated with the first target location on the touch sensor surface comprising the first delay, the first target voltage, and the second target voltage.

9. The method of claim 8, wherein triggering the first vibration cycle at the set of haptic actuators to oscillate the touch sensor surface at the target haptic intensity comprises:
   driving the first haptic actuator at the first target voltage; and
   driving the second haptic actuator at the second target voltage, the second haptic actuator cooperating with the first haptic actuator to oscillate the first target location at the target haptic intensity.

10. The method of claim 1:
   wherein triggering the sequence of vibration cycles across the set of haptic actuators to oscillate the touch sensor surface comprises, at a first time:
      sweeping a target oscillating voltage from a baseline frequency to a threshold frequency, offset from the baseline frequency, at a first haptic actuator, in the set of haptic actuators; and
      sweeping the target oscillating voltage from the threshold frequency to the baseline frequency at a second haptic actuator, in the set of haptic actuators; and
   wherein generating the first vibration cycle for the set of haptic actuators comprises:
      interpreting a first target frequency between the baseline frequency and the threshold frequency for the first haptic actuator associated with the first peak-to-peak haptic intensity;
      interpreting a second target frequency, different from the first target frequency, between the baseline frequency and the threshold frequency for the second haptic actuator associated with the first peak-to-peak haptic intensity; and
      generating the first vibration cycle associated with the first target location on the touch sensor surface comprising the first delay, the first target frequency, and the second target frequency.

11. The method of claim 10, wherein triggering the first vibration cycle at the set of haptic actuators to oscillate the touch sensor surface at the target haptic intensity comprises, at the first time:
   driving the first haptic actuator at the target oscillating voltage and at the first target frequency; and
   driving the second haptic actuator at the target oscillating voltage and at the second target frequency, the second haptic actuator cooperating with the first haptic actuator to oscillate the first target location at the target haptic intensity.

12. The method of claim 1, wherein accessing a target haptic intensity across a touch sensor surface during a haptic feedback cycle comprises:
   accessing a target haptic intensity map representing a set of regions across the touch sensor surface, each region in the set of regions defining a peak-to-peak haptic intensity; and
   during a first calibration period in the set-up period, extracting a first peak-to-peak haptic intensity from a first region, in the set of regions, encompassing the first target location on the touch sensor surface.

13. The method of claim 12:
   further comprising during a second calibration period in the set-up period:
      extracting a second peak-to-peak haptic intensity from a second region, in the target haptic intensity map, encompassing a second target location on the touch sensor surface, the second peak-to-peak haptic intensity less than the first peak-to-peak haptic intensity;
      at the calibration system, applying the probe, at the target selection force, to the second target location on the touch sensor surface;
      at the touch sensor, triggering the sequence of vibration cycles across the set of haptic actuators to oscillate the touch sensor surface;
      capturing a second haptic waveform representing oscillations at the second target location on the touch sensor surface during the sequence of vibration cycles; and
      interpreting a second vibration cycle for the set of haptic actuators corresponding to the second peak-to-peak haptic intensity at the second target location based on the second haptic waveform; and
   further comprising, at a second time during the set-up period, in response to detecting a second touch input proximal the second target location on the touch sensor surface, triggering the second vibration cycle at the set of haptic actuators to oscillate the second target location at the second peak-to-peak haptic intensity.

14. A method for modifying haptic feedback response comprising:
   during a set-up period:
      accessing a target haptic intensity across a touch sensor surface of a touch sensor during a haptic feedback cycle;
      at a calibration system, applying a probe, at a target selection force, to a first target location on a touch sensor surface;
      at a touch sensor, driving a target oscillating voltage at a sequence of phase offsets across the set of haptic actuators to oscillate the touch sensor surface;
      capturing a first haptic waveform representing oscillations at the first target location on the touch sensor surface;
      identifying a first peak-to-peak haptic intensity, in the first haptic waveform, corresponding to the target haptic intensity;
      calculating a first scalar coefficient based on a ratio of the first peak-to-peak haptic intensity and the target haptic intensity;
      identifying a first phase offset across the set of haptic actuators associated with the first peak-to-peak haptic intensity;
      generating a first vibration cycle associated with the first target location on the touch sensor surface comprising the first delay and the first scalar coefficient; and
   during a deployment period, following the set-up period:
      at a first time, capturing a first touch image representing magnitudes of forces detected on the touch sensor surface;
      interpreting a first force magnitude for a first touch input applied proximal the first target location on the touch sensor surface based on the first touch image; and
      in response to the first force magnitude exceeding the target selection force, driving the target oscillating voltage according to the first scalar coefficient and the first phase offset, in the first vibration cycle, to the set of haptic actuators to oscillate the touch sensor surface at the target haptic intensity.

\* \* \* \* \*